(12) United States Patent
Ikeda (10) Patent No.: US 9,987,603 B2
(45) Date of Patent: Jun. 5, 2018

(54) INJECTING MACHINE FOR INJECTING MIXTURE OF TWO DIFFERENT LIQUIDS IN FIRST-IN AND FIRST-OUT MANNER

(71) Applicant: NISSEI PLASTIC INDUSTRIAL CO., LTD., Nagano (JP)

(72) Inventor: Toru Ikeda, Nagano (JP)

(73) Assignee: NISSEI PLASTIC INDUSTRIAL, LTD. (JP)

( * ) Notice: Subject to any disclaimer, the term of this patent is extended or adjusted under 35 U.S.C. 154(b) by 548 days.

(21) Appl. No.: 14/153,890

(22) Filed: Jan. 13, 2014

(65) Prior Publication Data

US 2014/0196807 A1    Jul. 17, 2014

(30) Foreign Application Priority Data

Jan. 16, 2013 (JP) .................................. 2013-005547

(51) Int. Cl.
  *B29C 45/18*   (2006.01)
  *B29C 45/54*   (2006.01)
  (Continued)

(52) U.S. Cl.
  CPC .......... *B01F 5/0615* (2013.01); *B01F 5/0671* (2013.01); *B01F 7/246* (2013.01);
  (Continued)

(58) Field of Classification Search
  CPC ...... B01F 5/0615; B01F 7/248; B01F 13/103; B01F 13/1027; B01F 15/0278;
  (Continued)

(56) References Cited

U.S. PATENT DOCUMENTS 4,290,701 A * 9/1981 Schad ................. B29C 45/5008
                                                    366/77
4,473,299 A * 9/1984 Guibert .................... A21C 1/06
                                                    366/156.2
(Continued)

FOREIGN PATENT DOCUMENTS

AT    505641 A2 *  3/2009 ............. B29C 45/48
EP    909627 A1 *  4/1999
(Continued)

OTHER PUBLICATIONS

Machine translation of AT 505641 A2.*
(Continued)

*Primary Examiner* — Charles Cooley
(74) *Attorney, Agent, or Firm* — Adams & Wilks (57) ABSTRACT

An injecting machine includes an injection cylinder, a plunger, a plunger moving mechanism, and a mixing mechanism. The plunger is reciprocally received in the injection cylinder for moving between an advanced position and a retracted position, with the injecting a liquid mixture of two different liquid materials as the plunger moves to the advanced position. The plunger moving mechanism causes the plunger to move between the advanced position and the retracted position. The mixing mechanism is disposed on the injection cylinder for mixing the two different liquid materials together to feed the liquid mixture into the injection cylinder. The plunger includes a front portion having a helical groove formed on an outer circumferential surface thereof to allow the liquid mixture fed from the mixing mechanism to pass through the helical groove for collecting in a forward space formed forward of the front portion of the plunger.

16 Claims, 7 Drawing Sheets

(51) Int. Cl.
 B01F 5/06 (2006.01)
 B01F 7/24 (2006.01)
 B01F 13/10 (2006.01)
 B01F 15/02 (2006.01)

(52) U.S. Cl.
 CPC ............ B01F 7/248 (2013.01); B01F 13/103 (2013.01); B01F 13/1027 (2013.01); B01F 15/0279 (2013.01); B29C 45/1866 (2013.01); B29C 45/54 (2013.01); B29C 45/542 (2013.01); B01F 2005/0637 (2013.01); B29C 2045/547 (2013.01); Y10T 137/87652 (2015.04)

(58) Field of Classification Search
 CPC .... B01F 15/0279; B01F 7/246; B01F 5/0671; B01F 2005/0637; B29C 45/54–2045/548; Y10T 137/87652
 USPC ................................................ 366/76.3–76.4
 See application file for complete search history.

(56) References Cited

U.S. PATENT DOCUMENTS

| | | | | |
|---|---|---|---|---|
| 4,722,679 | A * | 2/1988 | Farrell | B29C 45/57 425/146 |
| 4,749,536 | A * | 6/1988 | Farrell | B29C 45/57 264/219 |
| 5,011,399 | A * | 4/1991 | Farrell | B29C 45/06 264/328.8 |
| 5,577,839 | A * | 11/1996 | Brams | B29C 45/18 366/158.3 |
| 5,653,534 | A * | 8/1997 | Matsumoto | B29C 45/1816 366/76.1 |
| 5,861,182 | A * | 1/1999 | Takizawa | B29C 45/54 425/557 |
| 5,925,295 | A * | 7/1999 | Nakamura | B29C 45/50 264/328.19 |
| 6,187,229 | B1 * | 2/2001 | Takayama | B29C 45/263 264/1.33 |
| 6,533,447 | B2 * | 3/2003 | Koide | B29C 45/54 366/100 |
| 8,123,394 | B2 * | 2/2012 | Becht | B01F 3/10 366/138 |
| 9,011,129 | B2 * | 4/2015 | Ikeda | B29C 45/1808 |
| 2002/0006076 | A1 * | 1/2002 | Koide | B29C 45/54 366/78 |
| 2003/0211197 | A1 * | 11/2003 | Burkle | B29C 45/0001 425/557 |
| 2004/0026809 | A1 * | 2/2004 | Kuzumi | B29C 45/531 264/40.1 |
| 2007/0140045 | A1 * | 6/2007 | Becht | B01F 3/10 366/160.4 |
| 2014/0196807 | A1 * | 7/2014 | Ikeda | B01F 5/0615 137/896 |
| 2014/0198600 | A1 * | 7/2014 | Ikeda | B29C 45/1866 366/76.7 |
| 2016/0001474 | A1 * | 1/2016 | Nakatani | B29C 45/54 264/50 |
| 2017/0157822 | A1 * | 6/2017 | Momono | B29B 7/426 |

FOREIGN PATENT DOCUMENTS

| | | |
|---|---|---|
| JP | 62255108 | 11/1987 |
| JP | 2000326376 | 11/2000 |
| JP | 2006117750 | 5/2006 |
| JP | 2006334974 | 12/2006 |
| JP | 2007076276 | 3/2007 |
| WO | 02/02293 A1 * | 1/2002 |

OTHER PUBLICATIONS

Notification of Reasons for Refusal dated May 12, 2015 issued in Japanese Patent Appln. No. P2013-005547 together with partial English translation thereof.

* cited by examiner

INJECTING MACHINE FOR INJECTING MIXTURE OF TWO DIFFERENT LIQUIDS IN FIRST-IN AND FIRST-OUT MANNER

FIELD OF THE INVENTION

The present invention relates to an improvement in an injecting machine for two different liquids.

BACKGROUND OF THE INVENTION

An injecting machine for receiving and mixing two different liquids together to inject a predetermined measured amount of a mixture of the two different liquids is known as disclosed in JP-A-2007-76276.

Figure 8:
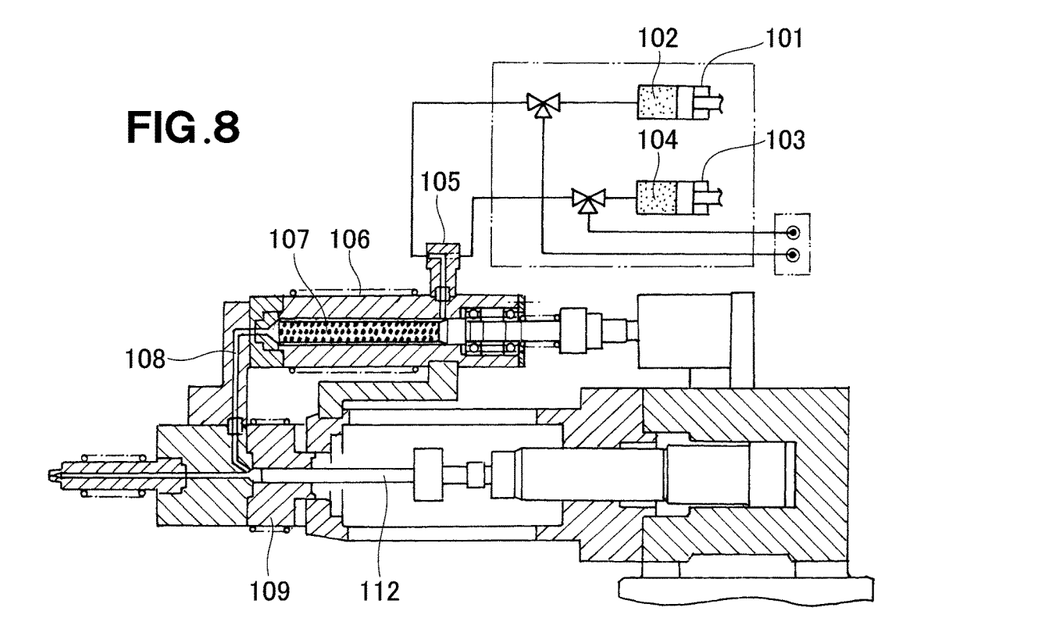
FIG. 8 is a schematic view of a prior art injecting machine for two different liquids.

FIG. 8 hereof shows an injecting machine disclosed in JP-A-2007-76276. A first cylinder 101 forces a first liquid 102 out while a second cylinder 103 forces a second liquid 104 out. The first liquid 102 and the second liquid 104 are combined together in a mixer 105 to flow into a mixing cylinder 106. The first and second liquids 102, 104 are sufficiently mixed together by rotation of a mixing shaft 107 in the mixing cylinder 106 to provide a liquid mixture of the first and second liquids 102, 104. The liquid mixture is introduced through a connecting passage into an injection cylinder 109.

Figure 9A:
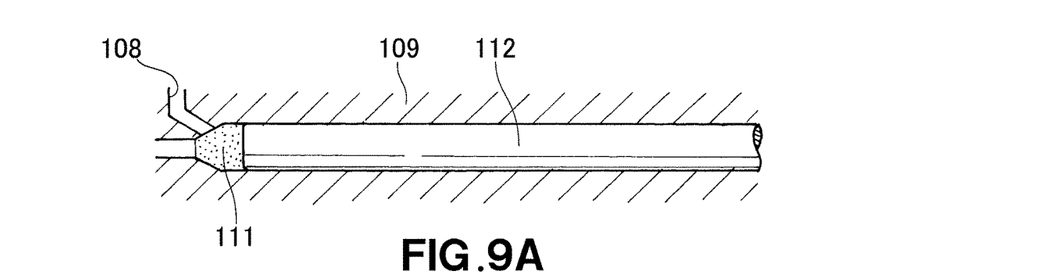
FIG. 9A is a view showing that a mixture of the two different liquids starts to collect in a forward space formed forwardly of a plunger of the injecting machine of FIG. 8.
Figure 9B:
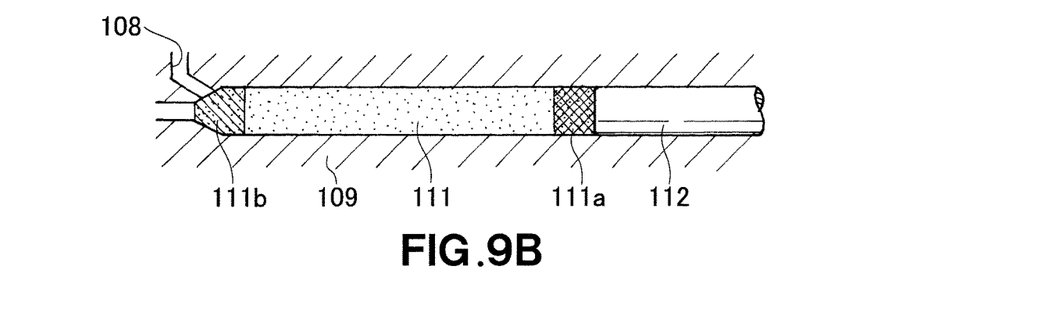
FIG. 9B is a view showing that the mixture fills up the forward space with the plunger in a retracted position.

Referring to FIG. 9A, the liquid mixture indicated at 111 collects in a forward space formed forwardly of a plunger 112. The forward space becomes large as the plunger 112 moves back, thereby increasing an amount of the collecting liquid mixture. As shown in FIG. 9B, a sufficient amount of the liquid mixture collects in the forward space immediately before injection of the liquid mixture when the plunger 112 is in a sufficiently retracted position.

The liquid mixture 111 collects in the forward space as follows. A first part 111a of the mixture first enters the forward space and then moves back with the plunger 112 such that the succeeding part of the mixture enters the forward space, and a last part 111b of the mixture finally enters and remains in the forward space furthest from the plunger 112.

As the plunger 112 advances, the mixture is injected in a "first-in last-out" manner in which the last part 111b which finally entered the forward space is first injected and the first part 111a which first entered the forward space is finally injected.

The liquid material tends to change its quality as time elapses. The first part 111a remains in the forward space for a long time while the last part 111b remains in the forward space for a short time. Since the first part 111a and the last part 111b remain in the forward space for different periods of time, as a result, undesirable difference in quality between the first part 111a and the last part 111b occurs. As measures against this undesirable quality difference, it is necessary for an injecting machine to inject a liquid mixture in a "first-in first-out" manner.

An object of the present invention is to provide an injecting machine for two different liquids, the machine being configured to inject a mixture of the two different liquids in a first-in first-out manner.

SUMMARY OF THE INVENTION

According to one aspect of the present invention, there is provided an injecting machine for two different liquid materials, comprising: an injection cylinder having a nozzle disposed on a distal end thereof; a plunger reciprocally received in the injection cylinder for moving between an advanced position and a retracted position, the plunger injecting a liquid mixture of the two different liquid materials as the plunger moves to the advanced position; plunger moving means for causing the plunger to move between the advanced position and the retracted position; and a mixing mechanism disposed on the injection cylinder for mixing the two different liquid materials together to feed the liquid mixture into the injection cylinder, and wherein the plunger includes a front portion having a helical groove formed on an outer circumferential surface thereof to allow the liquid mixture fed from the mixing mechanism to pass through the helical groove for collecting in a forward space formed forward of the front portion of the plunger.

The liquid mixture is directed by the helical groove of the plunger into the forward space formed forwardly of the plunger, in such a manner that a first part of the mixture first enters and remains in a front portion of the forward space and a last part of the mixture finally enters and remains in a rear portion of the forward space closest to the plunger. Movement of the plunger to the advanced position first injects the first part of the mixture. That is, the liquid mixture is injected in the first-in first-out manner to thereby prevent occurrence of difference in quality between the first part and the last part.

In a preferred form of the present invention, the two different liquid materials include a first liquid material and a second liquid material, and the mixing mechanism comprises: a mixing block; a screw rotatably accommodated in the mixing block; a screw rotating mechanism supported on the mixing block for rotating the screw; a first liquid supply passage disposed at a first portion of the mixing block for supplying the first liquid material to a proximal portion of the screw; a second liquid supply passage disposed at a second portion of the mixing block for supplying the second liquid material to the proximal portion of the screw, the second portion being separate from the first portion; and a first passage formed in the mixing block for causing the liquid mixture to flow out of a vicinity of a distal end of the screw.

An appropriate control over a rotational speed of the screw ensures a sufficient mixing time to help mix the first liquid material and the second liquid material together. Rotation of the screw feeds the first and second liquid materials at a low pressure.

In a further preferred form of the present invention, the first liquid supply passage has a first connection port formed in the first portion of the mixing block, and the second liquid supply passage has a second connection port formed in the second portion of the mixing block, the first connection port and the second connection port being arranged on a line passing through an axis of rotation of the screw, and the screw is interposed between the first connection port of the first liquid supply passage and the second connection port of the second liquid supply passage.

The first and second connection ports of the first and second liquid supply passages are formed together just by making a single hole through the mixing block. This results in the machining cost of the mixing block being reduced.

BRIEF DESCRIPTION OF THE DRAWINGS

Preferred embodiments of the present invention will be described in detail below, by way of example only, with reference to the accompanying drawings, in which like reference numerals designate like parts and in which.

DETAILED DESCRIPTION OF THE PREFERRED EMBODIMENTS

Figure 1:
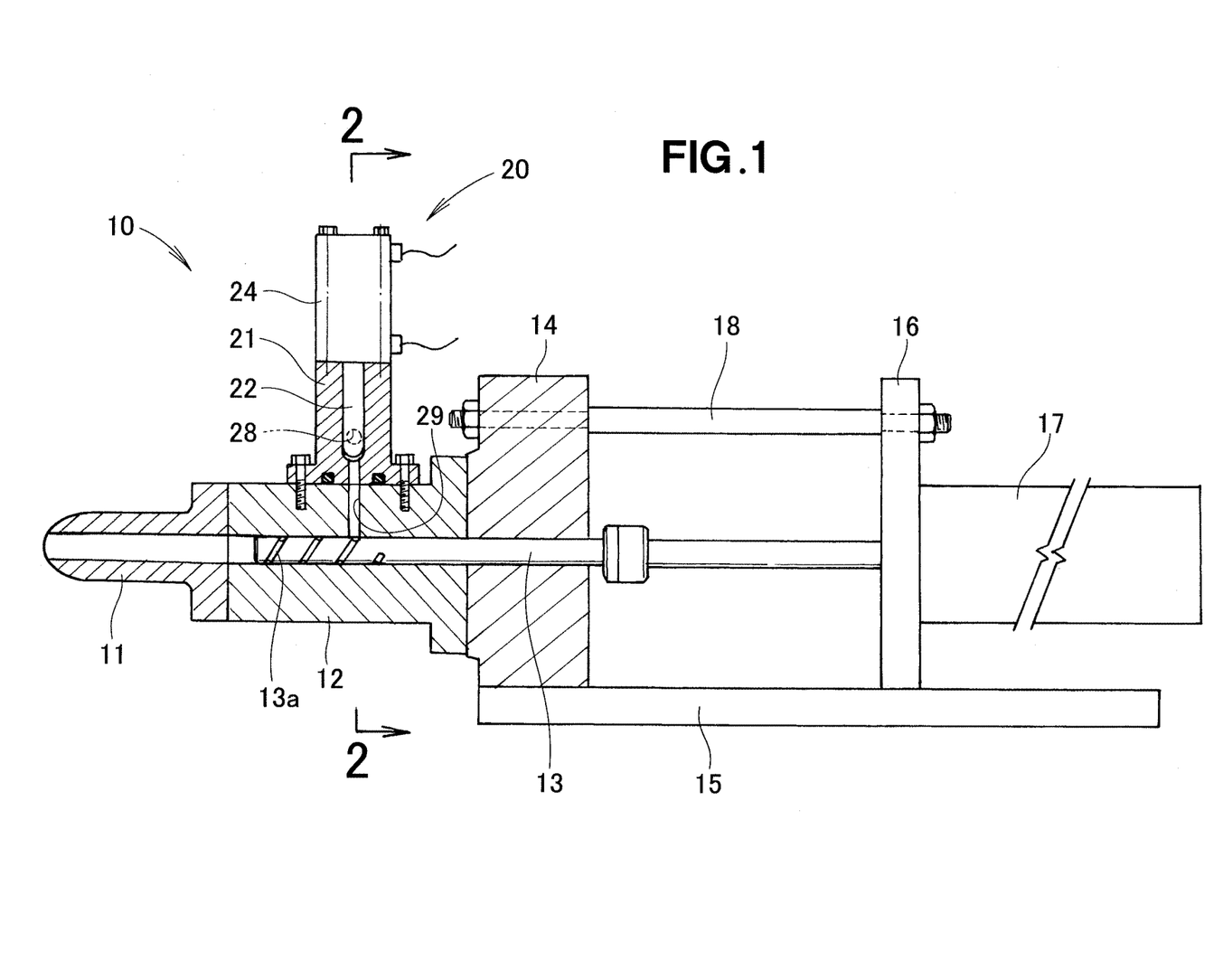
FIG. 1 is a side elevation view of an injecting machine for two different liquids.

As shown in FIG. 1, an injecting machine 10 for two different liquids includes an injection cylinder 12 having a nozzle 11 disposed on a distal end thereof, a bar-shaped plunger 13 axially movably received in the injection cylinder 12, a support plate 14 supporting a proximal portion of the injection cylinder 12, and a base 15 supporting the support plate 14. The machine 10 further includes a cylinder support plate 16 attached to the base 15 and disposed in parallel to the support plate 14. The machine 10 also includes plunger moving means 17 supported on the cylinder support plate 16 for reciprocating the plunger 13 between an advanced position and a retracted position. The machine 10 also includes a mixing mechanism 20 attached to a top surface of the injection cylinder 12.

The plunger 13 has a helical groove 13a formed on a front portion thereof.

The support plate 14 and the cylinder support plate 16 have their upper portions connected together by means of a tie rod 18 to prevent sway of the support plate 14 and the cylinder support plate 16.

The plunger moving means 17 is preferably a hydraulic cylinder, an air cylinder or an electric cylinder.

Figure 2:
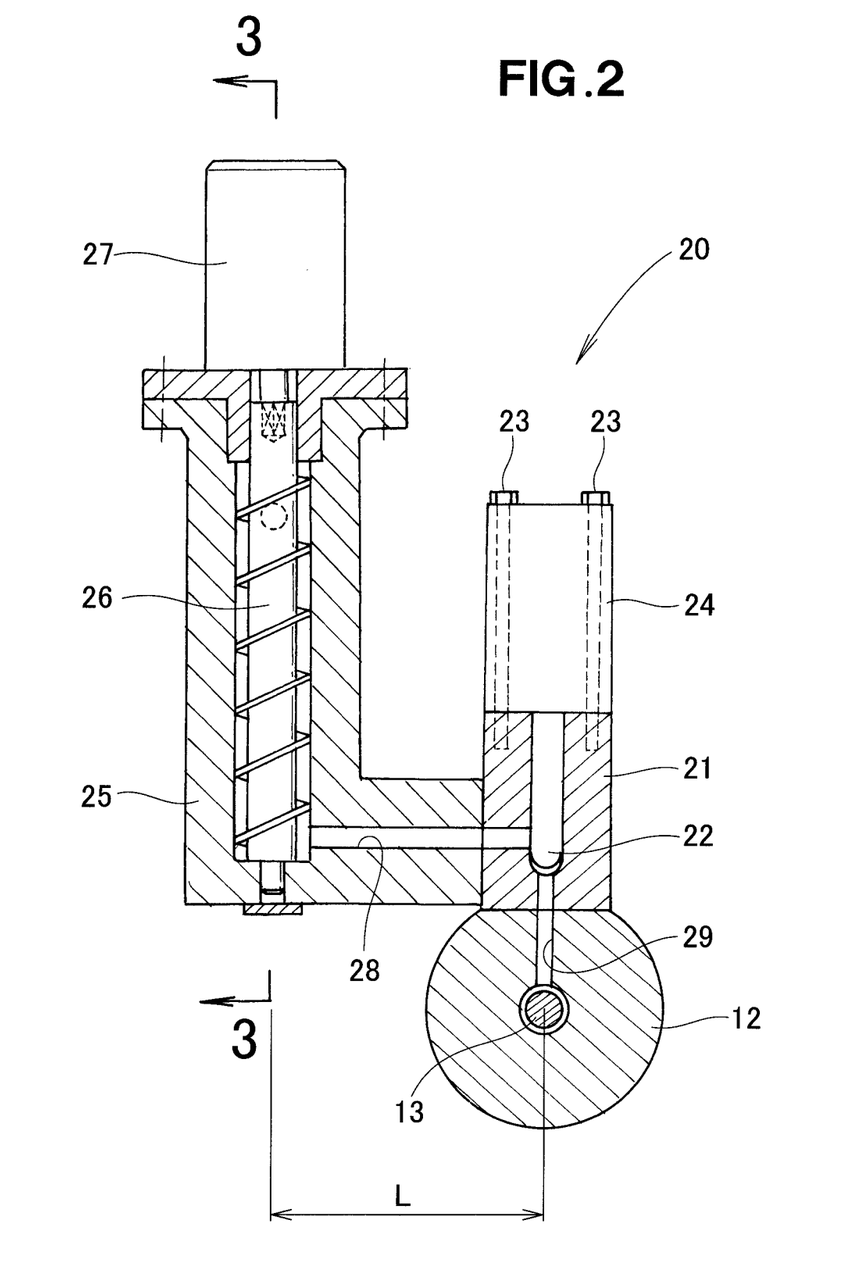
FIG. 2 is a cross-sectional view taken along line 2-2 of FIG. 1.

As shown in FIG. 2, the mixing mechanism 20 includes a body 21 carried on the top surface of the injection cylinder 12, a valve member 22 vertically movably received in the body 21, and a valve actuator 24 secured to a top of the body 21 through bolts 23, 23 for moving the valve member 22 vertically. The mixing mechanism 20 further includes a mixing block 25 attached to a lateral side of the body 21, a screw 26 rotatably received in the mixing block 25, and a screw rotating mechanism 27 attached to one end of the mixing block 25 for rotating the screw 26.

The screw rotating mechanism 27 is preferably an electric motor having a speed reducer.

A horizontal first passage 28 is formed in the mixing block 25 and extends into the body 21. A second passage 29 extends vertically downwardly from a distal end of the first passage 28 out of the body 21 and into the injection cylinder 12. When driven by the valve actuator 24 to move downwardly to a closed position, the valve member 22 closes the second passage 29. When driven by the valve actuator 24 to move upwardly to an open position, the valve member 22 brings the second passage 29 into fluid communication with the first passage 28.

Figure 3:
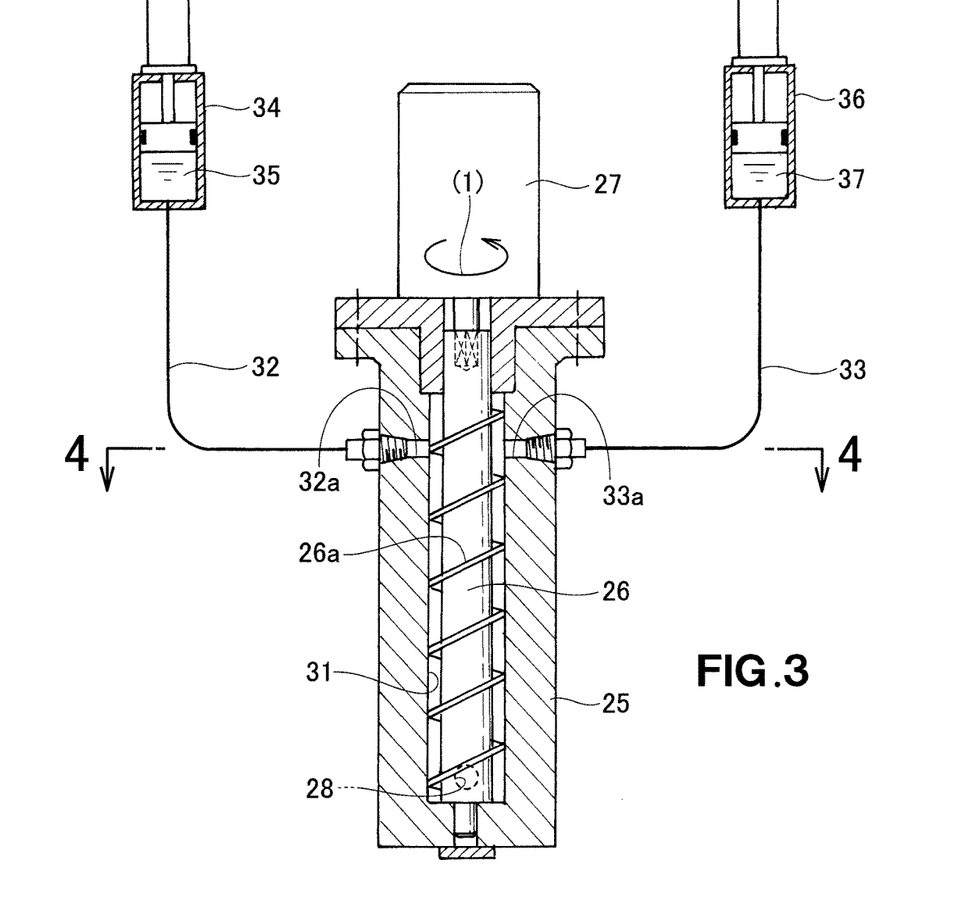
FIG. 3 is a cross-sectional view taken along line 3-3 of FIG. 2.

As shown in FIG. 3, the screw 26 includes a helical blade 26a and is accommodated in a mixing chamber 31 formed within the mixing block 25. The mixing chamber 31 has a lower portion communicating with the first passage 28. The mixing chamber 31 has an upper portion communicating with first and second liquid supply passages 32, 33. The first liquid supply passage 32 is adapted to deliver a first liquid or first liquid material 35, which has been forced out of a first cylinder 34, to the mixing chamber 31. The second liquid supply passage 33 is adapted to deliver a second liquid or second liquid material 37, which has been forced out of a second cylinder 36, to the mixing chamber 31. The first liquid supply passage 32 has a first connection port 32a communicating with the upper portion of the mixing chamber 31, and the second liquid supply passage 33 has a second connection port 33a communicating with the upper portion of the mixing chamber 31. These connection ports 32a, 33a can be formed by performing a drilling operation once on the mixing block 25.

Figure 4:
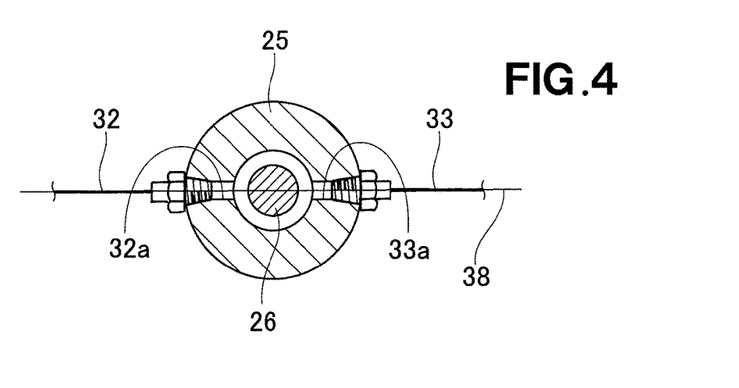
FIG. 4 is a cross-sectional view taken along line 4-4 of FIG. 3.

As shown in FIG. 4, the first connection port 32a of the first liquid supply passage 32 and the second connection port 33a of the second liquid supply passage 33 are arranged on a line 38 passing through an axis of rotation of the screw 26, and the screw 26 is interposed between the first connection port 32a and the second connection port 33a.

In FIG. 3, the screw rotating mechanism 27 rotates the screw 26 at a low speed, preferably, in a reverse direction as shown by an arrow (1). During the rotation of the screw 26, the first liquid 35 is delivered from the first liquid supply passage 32 into the mixing chamber 31 while the second liquid 37 is delivered from the second liquid supply passage 33 into the mixing chamber 31.

Since the screw 26 is positioned centrally of the mixing block 25, as shown in FIG. 4, the first and second liquids 35, 37 each first hit a proximal portion of the screw without mixing together. Thereafter, the first and second liquids 35, 37 each advance or flow down in a helical line along the helical blade 26a. A speed of the advancement (downward flow) of each of the first and second liquids 35, 37 is reduced due to the low speed reverse rotation of the screw as shown by the arrow (1). That is, the first and second liquids 35, 37 are agitated and mixed together by the screw 26 over a long period of time. The reverse rotation of the screw 26 sufficiently mixes the first and second liquids 35, 37 together even where the screw 26 is short.

Figure 5A:
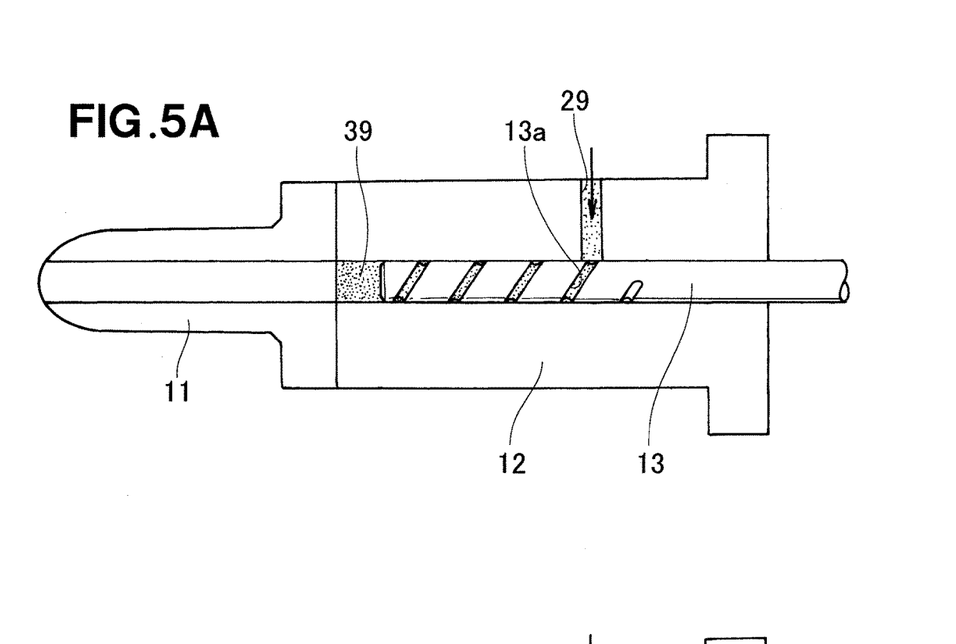
FIG. 5A is a view showing that a helical groove formed on a plunger of the injecting machine directs a mixture of the two different liquids into a forward space formed forwardly of the plunger as the plunger moves back.

A liquid mixture 39 of the first and second liquids 35, 37 passes from the second passage 29 through the helical groove 13a to collect in a forward space formed forwardly of the front portion of the plunger 13, as shown in FIG. 5A, as the plunger 13 gradually moves back.

The first liquid 35 is, for example, a curing agent (liquid silicone rubber) and the second liquid 37 is, for example, a base agent (liquid silicone rubber). After the second liquid 37 is mixed into the first liquid 35, the mixture of the first and second liquids 35, 37 changes in (physical) quality as time elapses.

Figure 5B:
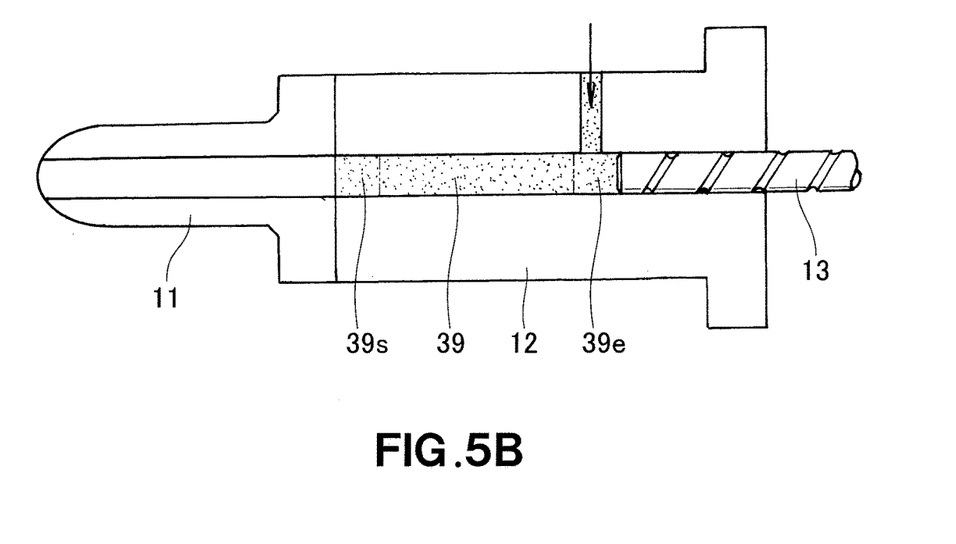
FIG. 5B is a view showing that the mixture fills up the forward space with the plunger in a retracted position.

When the plunger moves back to a fully retracted position, as shown in FIG. 5B, a first part 39s of the mixture 39, which has first entered the forward space formed forwardly of the front portion of the plunger 13, remains in a front portion of the forward space while a last part 39e of the mixture 39, which has finally entered the forward space, remains in a rear portion of the forward space (the rear portion being closest to the front portion of the plunger 13). As the plunger moves toward the advanced position, the first part 39s of the mixture 39 is first injected out of the nozzle 11, and the last part 39e of the mixture 39 is finally injected out of the nozzle 11. That is, the mixture 39 is injected in a "first-in first-out" manner such that a period of time during which the first part 39s remains in the injection cylinder 12 approximates a period of time during which the last part 39e remains in the injection cylinder 12 to thereby prevent occurrence of difference in quality between the first part 39s and the last part 39e. As a result, it becomes possible to reduce a maintenance time to prevent hardening of the mixture in the production process. In addition, it becomes possible to run the machine 10 continuously for an increased period of time so as to improve the productivity.

Referring back to FIG. 2, the first passage extends perpendicularly to the plunger 13, and the mixing block 25, the screw 26 and the screw rotating mechanism 27 are spaced a distance L away from the plunger 13. As a result, a moment directed in a counterclockwise direction in this figure is produced about the plunger 13. This moment acts as a twisting force on the injection cylinder 12. Where the mixing block 25, the screw 26 and the screw rotating mechanism 27 are made large in size, the moment increases and affects the injection cylinder 12.

It is preferable that no moment is produced in the machine. Discussion is made below as to an injecting machine modified to produce no moment discussed above.

Figure 6:
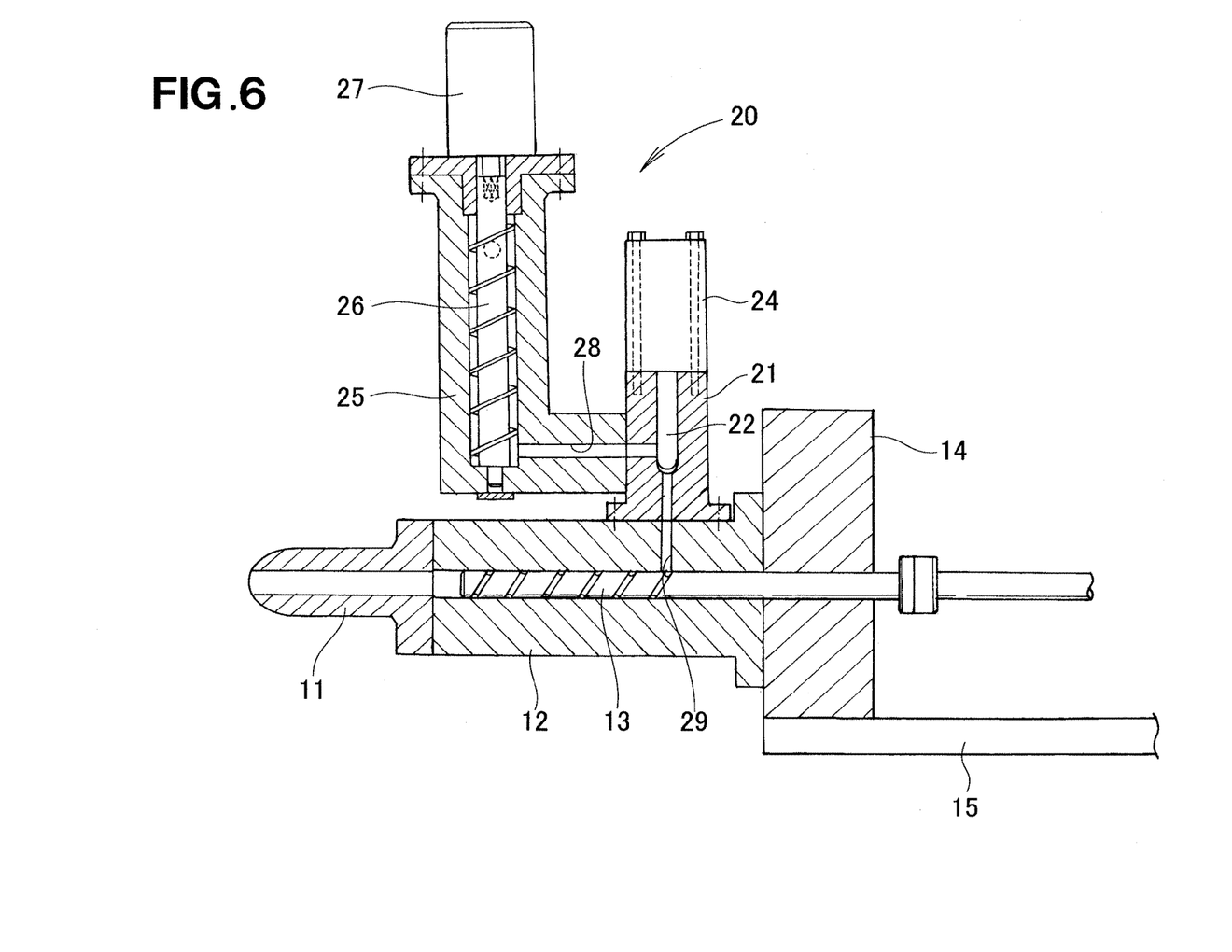
FIG. 6 is a view showing a modification to the injecting machine shown in FIG. 1.

As shown in FIG. 6, the first passage 28 extends in parallel to the plunger 13. That is, the body 21 and the mixing block 25 are arranged in a direction along an axis of the injection cylinder 12. This arrangement eliminates concern over generation of a moment which acts on the injection cylinder 12. Other elements of the modified injecting machine shown in FIG. 6 are the same as those of the injecting machine 10 and hence their discussions are omitted.

Discussion is made below as to a further modification to the injecting machine.

Figure 7:
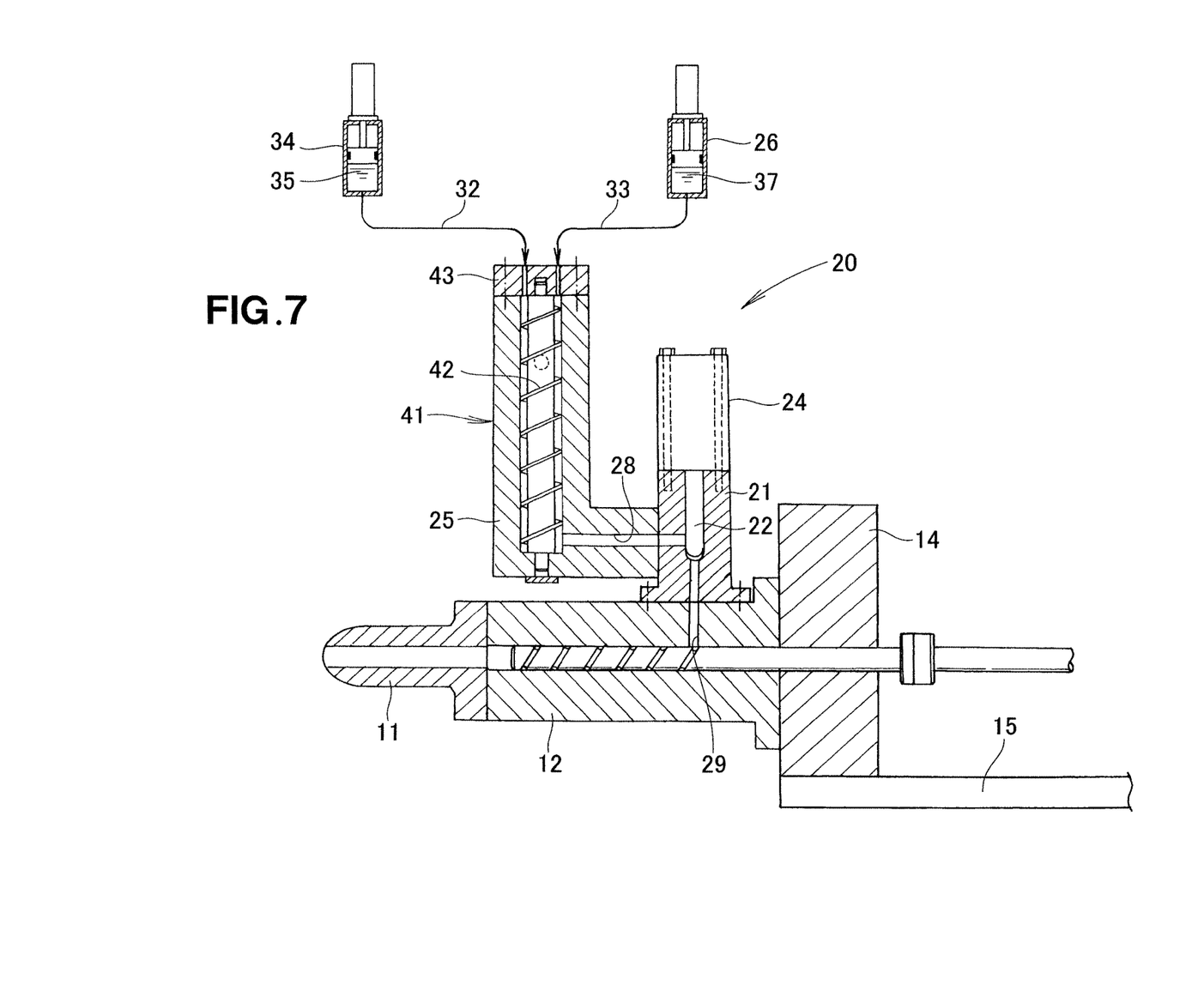
FIG. 7 is a view showing a further modification to the injecting machine shown in FIG. 1.

As shown in FIG. 7, the mixing mechanism 20 may include a static mixer 41. The static mixer 41 includes the mixing block 25, a stationary (non-rotatable) mixer element 42, and an end plate 43 disposed on one end of the mixer element 42 for introducing the first and second liquids 35, 37 into the mixing block 25. The mixer element 42 is preferably a leftward or rightward twisted plate.

The first liquid 35 is forced from the first cylinder 34 through the end plate 43 into the mixing block 25. Concurrently, the second liquid 37 is forced from the second cylinder 36 through the end plate 43 into the mixing block 25.

The first and second liquids 35, 37 are agitated and mixed together repeating a flow division, a rotational circulation and a flow reversal as the liquids 35, 37 flow along the mixer element 42. Since the static mixer 41 does not require the screw rotating mechanism 27 (FIG. 3), the mixing mechanism 20 is simple and cheap.

The injecting machine of the present invention is well suited for mixing and injecting first and second liquids of different properties.

Obviously, various minor changes and modifications of the present invention are possible in the light of the above teaching. It is therefore to be understood that within the scope of the appended claims the invention may be practiced otherwise than as specifically described.

What is claimed is:

1. An injecting machine for two different liquid materials, comprising:
   a generally horizontally disposed injection cylinder having a nozzle disposed on a distal end thereof;
   a plunger reciprocally received in the injection cylinder for moving between an advanced position and a retracted position, the plunger injecting a liquid mixture of the two different liquid materials as the plunger moves to the advanced position;
   plunger moving means for causing the plunger to move between the advanced position and the retracted position; and
   a mixing mechanism disposed on the injection cylinder for mixing the two different liquid materials together to feed the liquid mixture into the injection cylinder,
   wherein the plunger includes a front portion having a helical groove formed on an outer circumferential surface thereof to allow the liquid mixture fed from the mixing mechanism to pass through the helical groove for collecting in a forward space formed forward of the front portion of the plunger,
   wherein the two different liquid materials include a first liquid material and a second liquid material,
   wherein the mixing mechanism comprises:
      a mixing block disposed to extend generally vertically,
      a screw rotatably accommodated in the mixing block,
      a screw rotating mechanism supported on the mixing block for rotating the screw,
      a first liquid supply passage disposed at a first portion of the mixing block for supplying the first liquid material to a proximal portion of the screw,
      a second liquid supply passage disposed at a second portion of the mixing block for supplying the second liquid material to the proximal portion of the screw, the second portion being separate from the first portion, and
      a generally horizontally extending first passage formed in the mixing block for causing the liquid mixture to flow out of a vicinity of a distal end of the screw and being in communication with the injection cylinder,
   wherein the first liquid supply passage has a first connection port formed in the first portion of the mixing block, and the second liquid supply passage has a second connection port formed in the second portion of the mixing block, the first connection port and the second connection port being arranged on a line passing through an axis of rotation of the screw, and
   wherein the screw is interposed between the first connection port of the first liquid supply passage and the second connection port of the second liquid supply passage.

2. The injecting machine of claim 1, wherein the first passage is in communication with the injection cylinder via a second passage extending generally perpendicular to and from a distal end of the first passage and into the injection cylinder.

3. An injecting machine for two different liquid materials, comprising:
   a generally horizontally disposed injection cylinder having a nozzle disposed on a distal end thereof;
   a plunger reciprocally received in the injection cylinder for moving between an advanced position and a retracted position, the plunger injecting a liquid mixture of the two different liquid materials as the plunger moves to the advanced position;

plunger moving means for causing the plunger to move between the advanced position and the retracted position; and a mixing mechanism disposed on the injection cylinder for mixing the two different liquid materials together to feed the liquid mixture into the injection cylinder, wherein the plunger includes a front portion having a helical groove formed on an outer circumferential surface thereof to allow the liquid mixture fed from the mixing mechanism to pass through the helical groove for collecting in a forward space formed forward of the front portion of the plunger, and wherein the mixing mechanism comprises:
 a body mounted on a surface of the injection cylinder;
 a valve member vertically movably received in the body;
 a valve actuator secured to the body for driving the valve member to move between open and closed positions;
 a mixing block disposed to extend generally vertically attached to a lateral side of the body;
 a screw rotatably accommodated in the mixing block;
 a screw rotating mechanism supported on the mixing block for rotating the screw; and
 a first passage formed in the mixing block and extending to the body for causing the liquid mixture to flow out of a vicinity of a distal end of the screw and being in communication with the injection cylinder,
 the first passage extending generally horizontally.

4. The injecting machine of claim 3, wherein the mixing mechanism further comprises:
 a first liquid supply passage disposed at a first portion of the mixing block for supplying the first liquid material to a proximal portion of the screw, the first liquid supply passage having a first connection port formed in the first portion of the mixing block; and
 a second liquid supply passage disposed at a second portion of the mixing block different from the first portion thereof for supplying the second liquid material to the proximal portion of the screw, the second liquid supply passage having a second connection port formed in the second portion of the mixing block.

5. The injecting machine of claim 4, wherein the first connection port and the second connection port are arranged on a line passing through an axis of rotation of the screw.

6. The injecting machine of claim 5, wherein the screw is interposed between the first connection port of the first liquid supply passage and the second connection port of the second liquid supply passage.

7. The injecting machine of claim 3, wherein the first passage is in communication with the injection cylinder via a second passage extending generally perpendicular to and from a distal end of the first passage out of the body and into the injection cylinder.

8. The injecting machine of claim 7, wherein when driven by the valve actuator to move to the closed position, the valve member closes the second passage; and wherein when driven by the valve actuator to move to the open position, the valve member brings the second passage into fluid communication with the first passage.

9. An injecting machine for two different liquid materials, the injecting comprising:
 a mixing mechanism for mixing two different liquid materials together to provide a liquid mixture;
 a generally horizontally disposed injection cylinder mounted to the mixing mechanism for receiving the liquid mixture from the mixing mechanism, the injection mechanism having a nozzle disposed on a distal end thereof; and
 a plunger reciprocally received in the injection cylinder for moving between an advanced position and a retracted position, the plunger being configured to inject the liquid mixture out of the nozzle of the injection cylinder as the plunger moves to the advanced position, and the plunger including a front portion having a helical groove formed on an outer circumferential surface thereof to allow the received liquid mixture to pass through the helical groove for collecting in a forward space formed forwardly of the front portion of the plunger as the plunger moves to the retracted position;

wherein the mixing mechanism comprises:
 a body mounted on a surface of the injection cylinder;
 a valve member vertically movably received in the body;
 a valve actuator secured to the body for driving the valve member to move between open and closed positions;
 a mixing block disposed to extend generally vertically attached to a lateral side of the body;
 a screw rotatably accommodated in the mixing block;
 a screw rotating mechanism supported on the mixing block for rotating the screw, screw; and
 a first passage formed in the mixing block and extending to the body for causing the liquid mixture to flow out of a vicinity of a distal end of the screw and being in communication with the injection cylinder,
 the first passage extending generally horizontally.

10. The injecting machine of claim 9, further comprising plunger moving means for causing the plunger to move between the advanced position and the retracted position.

11. The injecting machine of claim 10, wherein when the plunger moving means causes the plunger to move to the retracted position, a first part of the liquid which has first entered the forward space formed forwardly of the front portion of the plunger remains in a front portion of the forward space while a remaining part of the liquid mixture which has thereafter entered the forward space remains in a rear portion of the forward space that is closest to the front portion of the plunger; and wherein when the plunger moving means causes the plunger to move to the advanced position, the first part of the liquid mixture is first injected out of the nozzle and the remaining part of the liquid mixture is thereafter injected out of the nozzle.

12. The injecting machine of claim 9, wherein the mixing mechanism further comprises:
 a first liquid supply passage disposed at a first portion of the mixing block for supplying the first liquid material to a proximal portion of the screw, the first liquid supply passage having a first connection port formed in the first portion of the mixing block; and
 a second liquid supply passage disposed at a second portion of the mixing block different from the first portion thereof for supplying the second liquid material to the proximal portion of the screw, the second liquid supply passage having a second connection port formed in the second portion of the mixing block.

13. The injecting machine of claim 12, wherein the first connection port and the second connection port are arranged on a line passing through an axis of rotation of the screw.

14. The injecting machine of claim 13, wherein the screw is interposed between the first connection port of the first liquid supply passage and the second connection port of the second liquid supply passage.

15. The injecting machine of claim 9, wherein the first passage is in communication with the injection cylinder via a second passage extending generally perpendicular to and from a distal end of the first passage out of the body and into the injection cylinder.

16. The injecting machine of claim 15, wherein when driven by the valve actuator to move to the closed position, the valve member closes the second passage; and wherein when driven by the valve actuator to move to the open position, the valve member brings the second passage into fluid communication with the first passage.

* * * * *